Patented Apr. 25, 1933

1,905,376

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

ROOFING MASTIC

No Drawing.   Application filed June 4, 1920.  Serial No. 386,609.

This invention relates to a mastic substance to be used in weatherproofing or waterproofing, and other like purposes. It is particularly adapted to roofing purposes where it is applied over satuarated felts, fabrics, paper, or other fibrous goods, or where such goods are impregnated with the substance.

While the invention will no doubt find its largest field of application in the art of roofing, and will be illustrated mainly in that connection, it is not the purpose to limit the subjoined claims to roofing, unless the context expressly so states.

The new mastic substance may be packed in bulk or furnished on the fabric as a vehicle; or the vehicle may be saturated with the mastic substance.

It has been customary to use roofing cements for various repair purposes; also for coating jobs, but these have usually dried out rapidly. It is the purpose, in the present invention, to adapt the mastic substance in its various forms, to all such purposes. It is particularly adapted for use upon saturated felts for seaming purposes, where it can be applied between sheets or other members of roofing material, also in various consistencies, as a coating on said sheets.

The invention has for its object to provide a bituminous or asphaltic cement containing ingredients through means of which to determine, at will, the degree of fluidity, plasticity, and adhesiveness, as well as the duration of the quality of adhesiveness of the mastic substance, so that the substance, or goods treated therewith, may be conditioned to meet varying requirements in roofing operations prior to the arrival of the goods on the job; in other words, to permit shipping the roofing goods or product in such a state that even after having remained in the warehouse through varying temperatures, it will remain in commercially satisfactory condition until it reaches the final consumer, and particularly the condition of self-adhesiveness &c., as set forth in co-pending applications filed by me, towit: Serial No. 336,713, filed November 8, 1919; and Serial No. 365,001, filed March 15, 1920, the latter of which issued on July 13, 1926 into Patent No. 1,592,760. According to these applications, the mastic substance applied at the place of manufacture to the seaming areas of roofing materials, or as a coating to roofing materials, has the inherent quality of maintaining its condition during the time which may reasonably elapse between manufacture of the goods and their application to the building structure, and which inherent condition involves any one of the features of lasting adhesiveness, retention of plasticity in a mass of sufficient volume to afford an effective packing or filler for spaces between roofing members and like purposes, or retention of mass between ribs or beads which serve as confining walls for the adhesive or plastic mastic, and also serve as means for interlocking overlapped sheets to resist separation in the plane of the sheet.

Where surface adhesiveness alone is desired for only a limited period of time, asphaltic or bituminous bases or bodies can be used in their prepared or original state, particularly when a layer required is thin enough to avoid running under temperatures that must be encountered before the goods are applied upon the roof, or otherwise adapted by its inherent conditions to meet the varying conditions and temperatures incident to the particular channel through which it is marketed, and field in which it is to be employed, so that it may reach the ultimate consumer in a state ready for application in a practical manner. But this condition of lasting adhesiveness or retarded drying can be insured by the addition of non-drying oils, of vegetable or other varieties and as an example cotton seed oil, castor oil, or creosote oil and other numerous varieties. Some of these non-drying oils do not interfere with the adhesiveness, while other non-drying oils destroy the adhesiveness more or less, and simply maintain plasticity and keep the plastic mass in a desirable condition for joint packing purposes, so that it will conform to irregularities between overlapping sheets where a heavier body of mastic is required. Where it is desirable to employ a mastic body that will develop a plastic packing between two overlapped sheets, or effect the filling of cracks, or develop a substantial coating over porous substances, the inherent quality of self insulation sufficient to insure retention of mass and form will be developed in the mastic by the use of a filler, in sufficient proportion to the base of the mastic to prevent running or flowing under any temperature to which the mastic, or the material on which it is placed, may be subjected in storage, or in the use for which it is intended. Such a mastic, which is cheaper to produce in its several combinations by reason of the ingredients used, is more economical to use by reason of the elimination of labor, since the labor required in applying it is performed by machinery where formerly it was performed by hand.

Any subdivided filler may be employed to give the base of the mastic proper body and heat insulating quality, such as mineral wool, fuller's earth, whiting, Celite, clay, linters (being the lint recovered by abrasion of cotton seed after ginning), or asbestos fiber, which have either the property of absorbing the oil and holding it in suspension, or the property of interfering with the flow by reason of their fiber. Any of these substances will act as an insulator and flow retarder, by holding the basic bituminous or asphaltic substance in suspension, and through means of them any desired flow point or melting point and bulk can be imparted by selecting the base used and the proportion of filler added. This filler also, in the case of the fiber, linters, etc., acts as a holding medium against the force of gravity, when the cement is used between cracks and for coating purposes. It further acts as a bulk filler, which upon being placed between overlapping sheets, conforms to the spaces and irregularities which otherwise might allow the infiltration of water or other liquid or substances to be excluded.

Where it is desired to lend to the bituminous or asphaltic material a gummy characteristic so that it can with advantage be placed between the surfaces of two overlapping roofing members and leave them free to be pulled apart, the asphaltic or bituminous base is combined with rosin, gum, non-drying oils, and boiled linseed oil, or a compound allied in physical characteristics to the commercial article known as "tree tanglefoot". This will also have the effect of retarding the drying or prolonging the stickiness of the mastic, and will cause it to break apart when the roofing members or parts of a roofing member are separated, instead of drawing out into a stringy condition. The addition of these ingredients or this substance to bituminous bases or mastic containing volatile oils, retards the evaporation of the volatile oils and continues the properties of such quick drying mastic for a prolonged period.

Where a packing is desired without great stickiness but mainly with plasticity which will adapt it to enter between overlapped roofing members, into cracks, or over porous surfaces, the same base is used with a non-drying oil which destroys the stickiness but maintains the mastic quality, and then any one or more of the fillers hereinbefore described are added to give bulk to the mass and raise its flowing point.

Where a jelly-like cushion is desired, the basic asphaltic or bituminous material has added to it a combination of glue and glycerine, or a combination of gelatine and glycerine, or such other substance as produces a like effect, which sets the same as gelatine and keeps the mastic in a sticky, non-drying state, yet presents a tough stiff body. If desired, any one or more of the filling materials may be added to this mixture to increase its mass and control its consistency. Similarly, the volatile quick-drying mastic may be retarded in others of the compounds hereindescribed by mixing therewith this jelly-like substance which serves as a solvent to retain the adhesive character of the specified gummy substances used in conjunction with the bituminous material.

Any of the mixtures herein described may be combined to obtain varying characteristics in the resultant mastic body, and the substance thus rendered suitable for the various uses described in my copending applications referred to, or for other commercial purposes to which they may be put, whether in connection with the art of roofing or covering surfaces with sheet materials, or any other art wherein it may be desired to produce effects similar to those described herein.

A body of material may be obtained with more than one of the substances herein named. Thus, a paper may be thinly coated with one form of mastic herein described, and then another one of the herein described compounds placed over the coating; or the material may first be saturated with the basic material, or with any one of the combinations herein mentioned, while in a heated state, or even cold. When saturated with the substance in a heated state, the substance will be such that it will develop the conditions desired by cooling. Again, the material provided with any one of the herein described compounds which dry when set, may thereafter be treated with a surface coating of a sticky mastic, or with a solvent of such character as will restore the mass to its original sticky state so as to cause it to adhere to a contacting surface while still maintaining cushioning effect as one of its inherent qualities.

A strip of felt, or fabric of fiber or fibrous substance adapted to be located in contact with two overlapping sheets, may be prepared for such use by applying to it one of the herein described compounds which dry when set, and of such a nature that it is merely necessary to immerse or coat the surface of the material in a suitable solvent to adapt it to assume an adhesive characteristic that will enable it to serve its intended purpose.

According to one use of the invention herein described, a mastic of lasting adhesiveness will be applied to the surfaces of two overlapping members, or on a surface adapted to lie between two overlapping members or filled with fibrous material or filler, and these will be placed together so as to confine and preserve the mastic between them until reaching the place of use, when they will be pulled asunder to expose upon each a self adhering surface.

A plastic mass according to some of the formulas herein described is well adapted for use in the protection of vegetation against insect life, by putting the cement into cracks of or in circles about the plants or trees which it is desired to protect. The added asphaltic base makes it more waterproof and the stickiness is more prolonged.

I claim:

1. A waterproof mastic comprising a bituminous body, gummy substances in said body serving as an adhesive therefor, and a jelly-like substance mixed with said adhesive to retard the setting thereof under storage conditions.

2. A mastic material comprising a bituminous base, an adhesive ingredient incorporated with said base, and a glycerine constituent combined with said adhesive to prolong the setting thereof.

Signed at Chicago, Illinois, this 2nd day of June, 1920.

ALBERT C. FISCHER.